(12) United States Patent
Venu et al.

(10) Patent No.: US 12,554,501 B2
(45) Date of Patent: Feb. 17, 2026

(54) DATA PROCESSING APPARATUS AND METHOD FOR TRANSMITTING TRIGGERED INSTRUCTIONS BETWEEN PROCESSING ELEMENTS

(71) Applicant: Arm Limited, Cambridge (GB)

(72) Inventors: Balaji Venu, Cambridge (GB); Mbou Eyole, Soham (GB); Giacomo Gabrielli, Cambridge (GB)

(73) Assignee: Arm Limited, Cambridge (GB)

( * ) Notice: Subject to any disclaimer, the term of this patent is extended or adjusted under 35 U.S.C. 154(b) by 223 days.

(21) Appl. No.: 18/580,865

(22) PCT Filed: Jun. 22, 2022

(86) PCT No.: PCT/GB2022/051589
§ 371 (c)(1),
(2) Date: Jan. 19, 2024

(87) PCT Pub. No.: WO2023/007114
PCT Pub. Date: Feb. 2, 2023

(65) Prior Publication Data
US 2024/0370263 A1 Nov. 7, 2024

(30) Foreign Application Priority Data
Jul. 26, 2021 (GB) .................................... 2110727

(51) Int. Cl.
*G06F 9/38* (2018.01)
*G06F 1/3296* (2019.01)
*G06F 9/30* (2018.01)

(52) U.S. Cl.
CPC .............. *G06F 9/38* (2013.01); *G06F 1/3296* (2013.01); *G06F 9/3016* (2013.01)

(58) Field of Classification Search
None
See application file for complete search history.

(56) References Cited

U.S. PATENT DOCUMENTS 12,260,221 B2 * 3/2025 Eyole ..................... G06F 9/3836
2024/0086196 A1 * 3/2024 Walker .................. G06F 9/3824

FOREIGN PATENT DOCUMENTS

EP 0352080 A2 1/1990
EP 1821200 A2 8/2007

OTHER PUBLICATIONS

Combined International Search and Examination Report for International Application No. GB2110727.1 dated Apr. 22, 2022.
(Continued)

*Primary Examiner* — Michael Sun
(74) *Attorney, Agent, or Firm* — NIXON & VANDERHYE P.C.

(57) ABSTRACT

There is provided a data processing apparatus and a method of operating a data processing apparatus. The data processing apparatus comprises a plurality of processing elements connected via a network on a single chip arranged to form a triggered spatial architecture. Each processing element comprises front end circuitry configured to generate triggered instructions which are passed to decode circuitry to cause the processing element to perform processing operations. Some processing elements are configured to operate in a producing mode in which the processing element transmits the triggered instructions as consumer instructions to be executed by each of a set of processing elements when operating in a consuming mode. Some processing elements are configured to operate in the consuming mode in which the processing elements retrieve consumer instructions transmitted from a processing element operating in a producing mode, and pass the consumer instructions to the decode circuitry.

20 Claims, 11 Drawing Sheets

(56) References Cited

OTHER PUBLICATIONS

Figure 1:
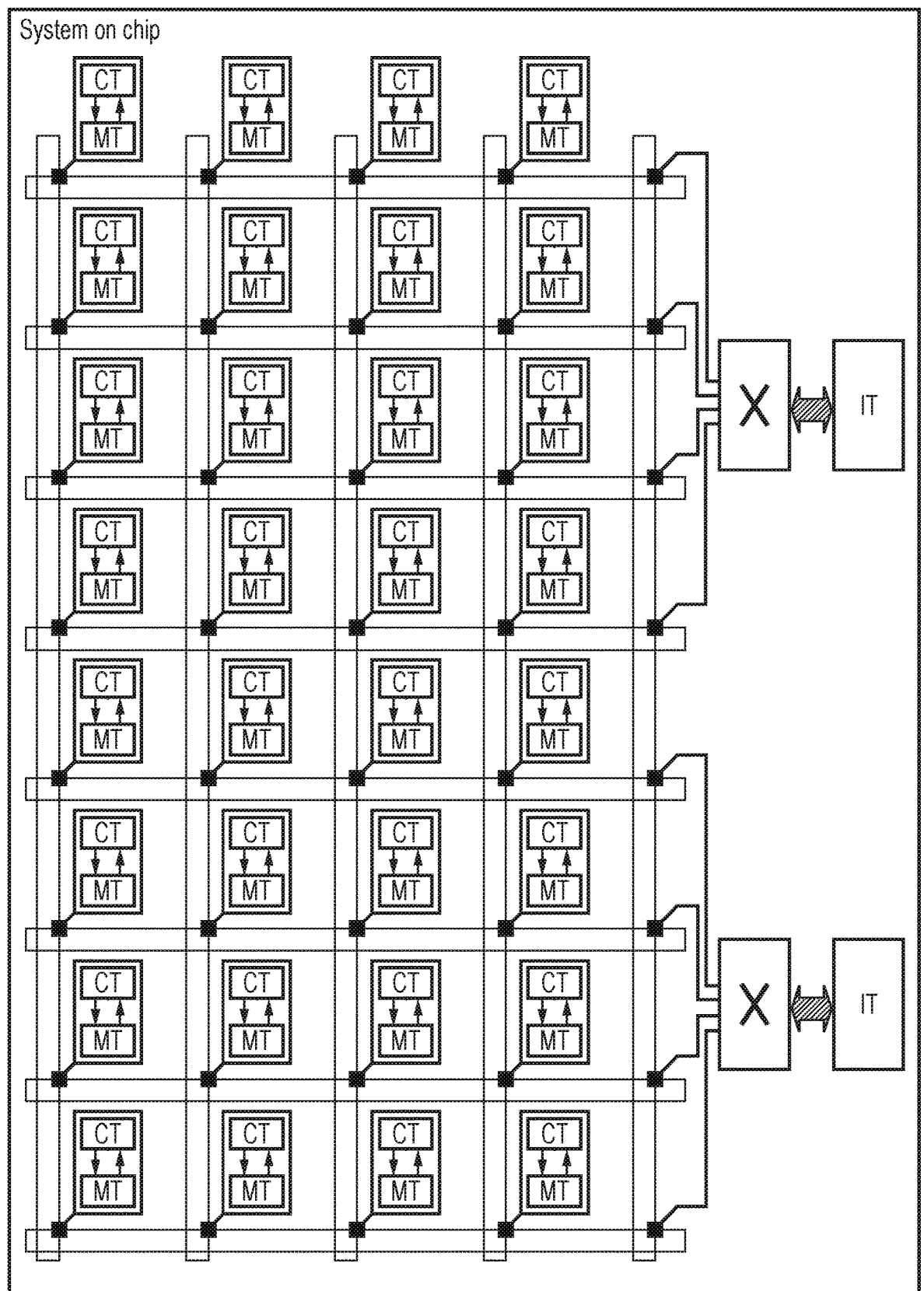

International Search Report and Written Opinion for International Application No. PCT/GB2022/051589, dated Jul. 25, 2022.
Examination Report for international application No. GB2110727.1, dated Jul. 17, 2023.
Parashar et al, "Efficient Spatial Processing Element Control Via Triggered Instructions," Published by the IEEE Computer Society, Jan. 6, 2021.

* cited by examiner

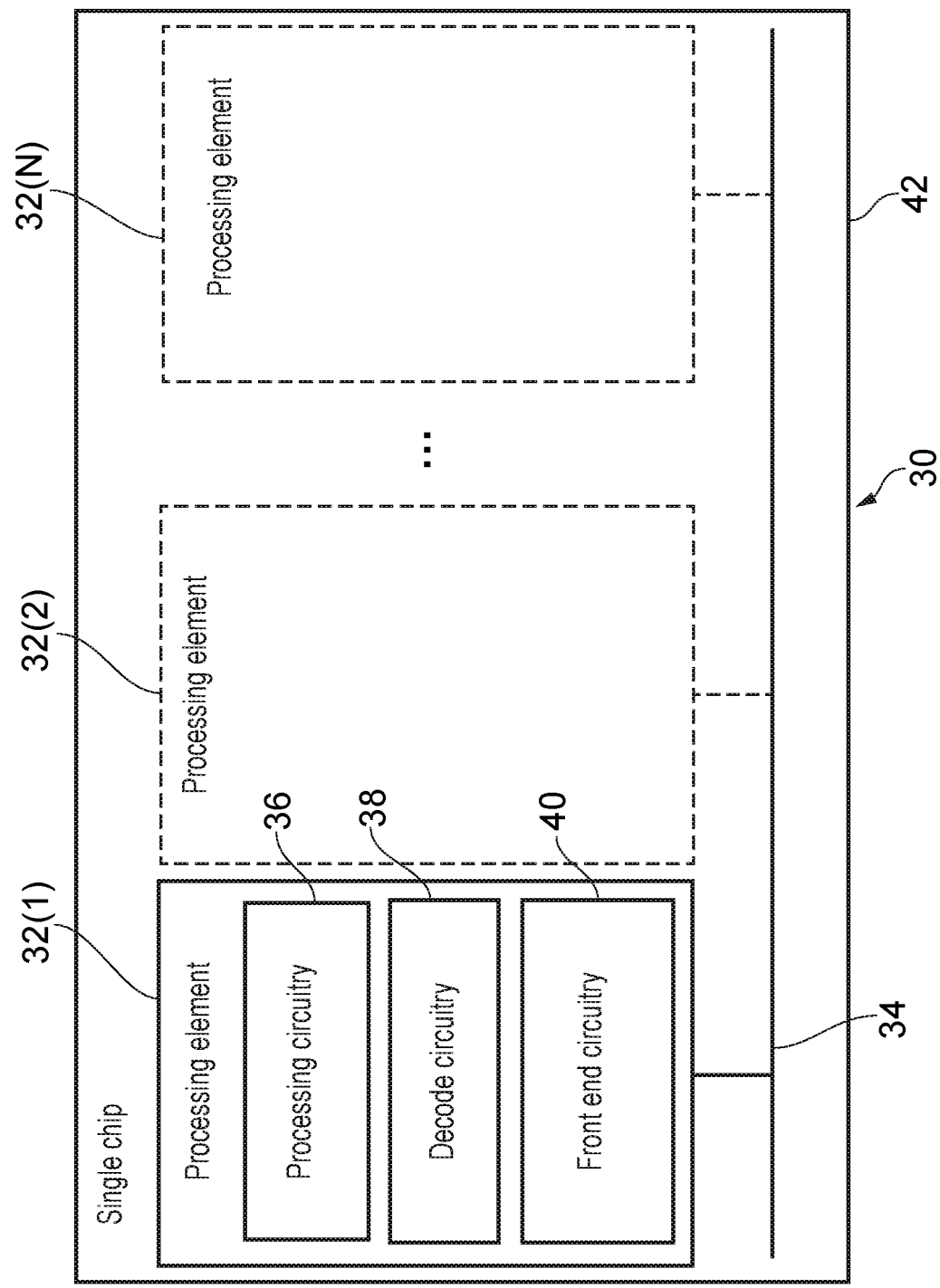

DATA PROCESSING APPARATUS AND METHOD FOR TRANSMITTING TRIGGERED INSTRUCTIONS BETWEEN PROCESSING ELEMENTS

Some data processing apparatuses are provided with a plurality of processing elements connected via a network on a single chip arranged to form a triggered spatial architecture. Rather than executing in an order defined by a program counter, processing elements of a triggered spatial architecture execute each instruction in response to an execution state of the processing element meeting a trigger condition associated with that instruction. In this way each of the processing elements is able to operate independent and asynchronously from the other processing elements.

In some configurations there is provided a data processing apparatus comprising a plurality of processing elements connected via a network on a single chip arranged to form a triggered spatial architecture, each processing element of the plurality of processing elements comprising: front end circuitry configured to process a plurality of instructions, and to generate triggered instructions, each triggered instruction generated in response to an execution state of the processing element meeting a trigger condition associated with one of the plurality of instructions; decode circuitry configured to, in response to receiving the triggered instructions, generate control signals; and execution circuitry configured to, in response to the control signals, perform processing operations and modify the execution state of the processing element, wherein: the decode circuitry is configured to, in response to a begin consuming instruction, generate begin consuming control signals to control the processing element to operate in a consuming mode; and the processing element is configured to, when operating in the consuming mode, retrieve consumer instructions transmitted from a corresponding processing element operating in a producing mode, and pass the consumer instructions to the decode circuitry as triggered instructions.

In some configurations there is provided a data processing apparatus comprising a plurality of processing elements connected via a network on a single chip arranged to form a triggered spatial architecture, each processing element of the plurality of processing elements comprising: front end circuitry configured to process a plurality of instructions, and to generate triggered instructions, each triggered instruction generated in response to an execution state of the processing element meeting a trigger condition associated with one of the plurality of instructions; decode circuitry configured to, in response to receiving the triggered instructions, generate control signals; and execution circuitry configured to, in response to the control signals, perform processing operations and modify the execution state of the processing element, wherein: the decode circuitry is configured to, in response to a begin producing instruction, generate begin producing control signals to control the processing element to operate in a producing mode; and the processing element is configured to, when operating in the producing mode, transmit the triggered instructions as consumer instructions to a set of processing elements of the plurality of processing elements, the consumer instructions to be executed by each of the set of processing elements when operating in a consuming mode.

In some configurations there is provided a data processing method for operating a data processing apparatus comprising a plurality of processing elements connected via a network on a single chip arranged to form a triggered spatial architecture, each processing element comprising front end circuitry, decode circuitry, and execution circuitry, the method comprising: processing, using the front end circuitry a plurality of instructions, and generating triggered instructions, each triggered instruction generated in response to an execution state of the processing element meeting a trigger condition associated with one of the plurality of instructions; generating control signals, using the decode circuitry, in response to receiving the triggered instructions; performing processing operations execution circuitry in response to the control signals and modifying the execution state of the processing element; generating, using the decode circuitry, begin consuming control signals to control the processing element to operate in a consuming mode in response to a begin consuming instruction; and retrieving, when operating in the consuming mode, consumer instructions transmitted from a corresponding processing element operating in a producing mode, and passing the consumer instructions to the decode circuitry as triggered instructions.

In some configurations there is provided a data processing method for operating a data processing apparatus comprising a plurality of processing elements connected via a network on a single chip arranged to form a triggered spatial architecture, each processing element comprising front end circuitry, decode circuitry, and execution circuitry, the method comprising: processing, using the front end circuitry a plurality of instructions, and generating triggered instructions, each triggered instruction generated in response to an execution state of the processing element meeting a trigger condition associated with one of the plurality of instructions; generating control signals, using the decode circuitry, in response to receiving the triggered instructions; and performing processing operations, using the execution circuitry, in response to the control signals and modifying the execution state of the processing element; generating, using the decode circuitry, begin producing control signals to control the processing element to operate in a producing mode in response to a begin producing instruction; and transmitting, when operating in the producing mode, the triggered instructions as consumer instructions to a set of processing elements of the plurality of processing elements, the consumer instructions to be executed by each of the set of processing elements when operating in a consuming mode.

Figure 2:
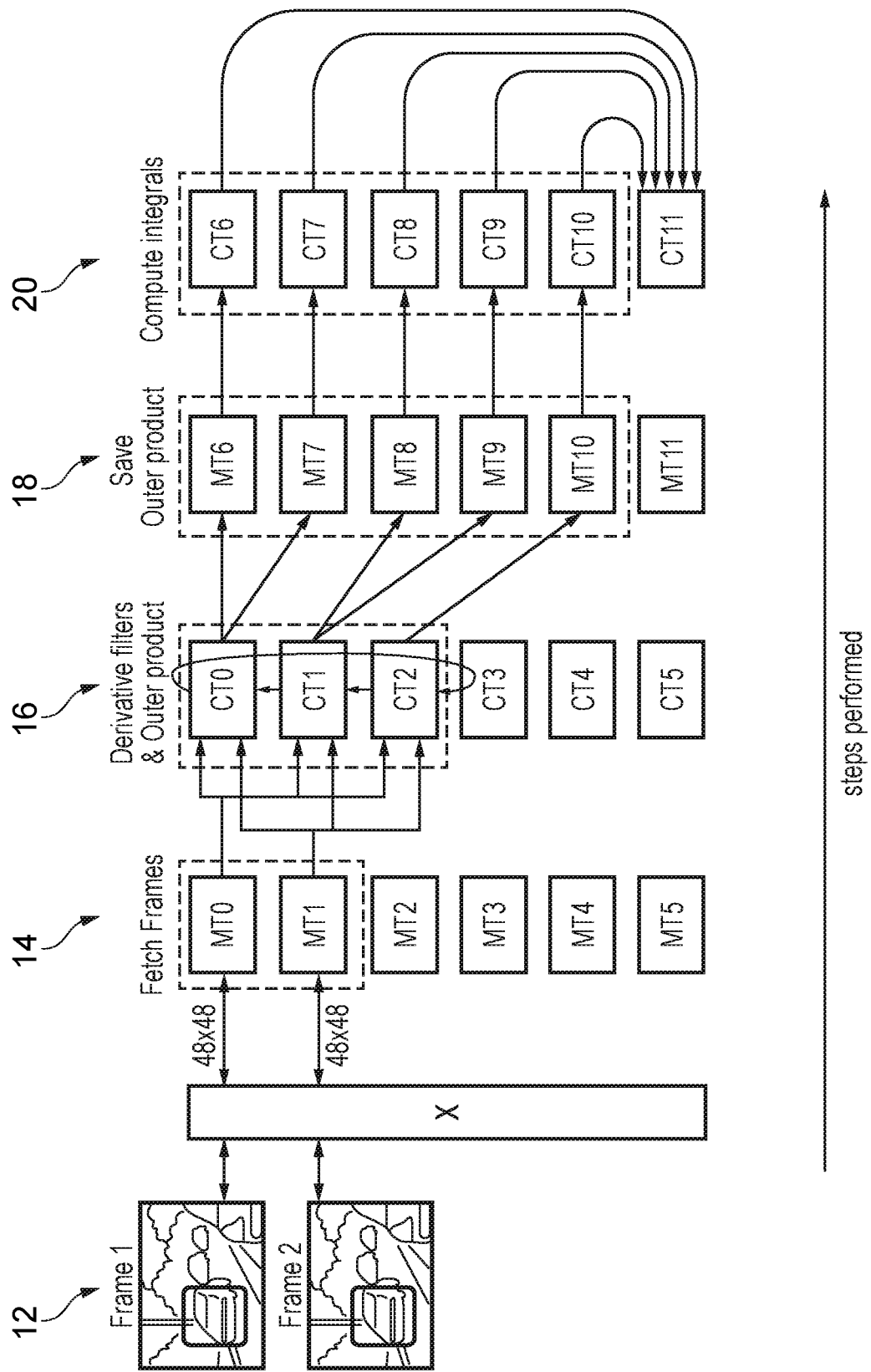
Figure 3B:
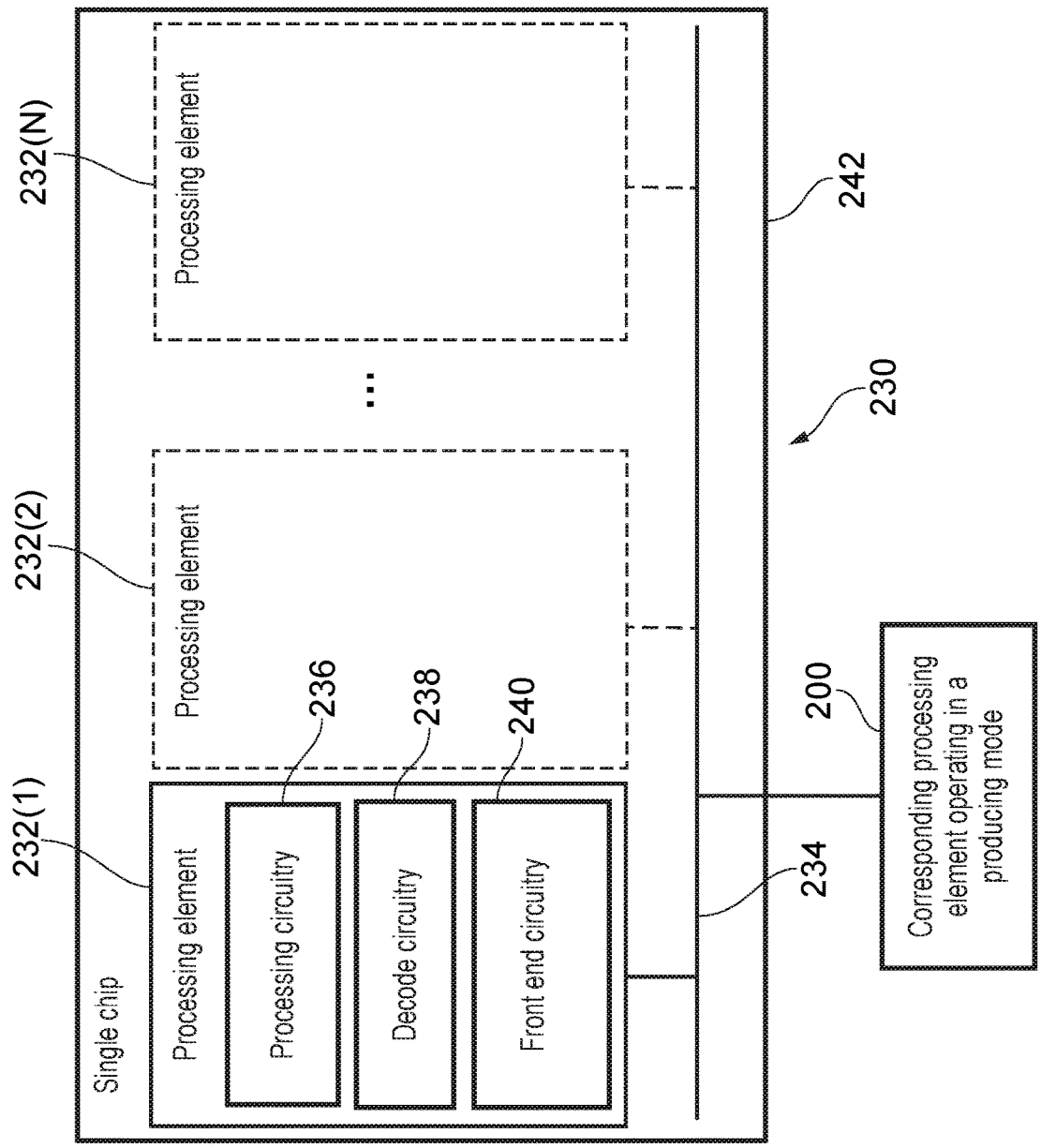
Figure 4A:
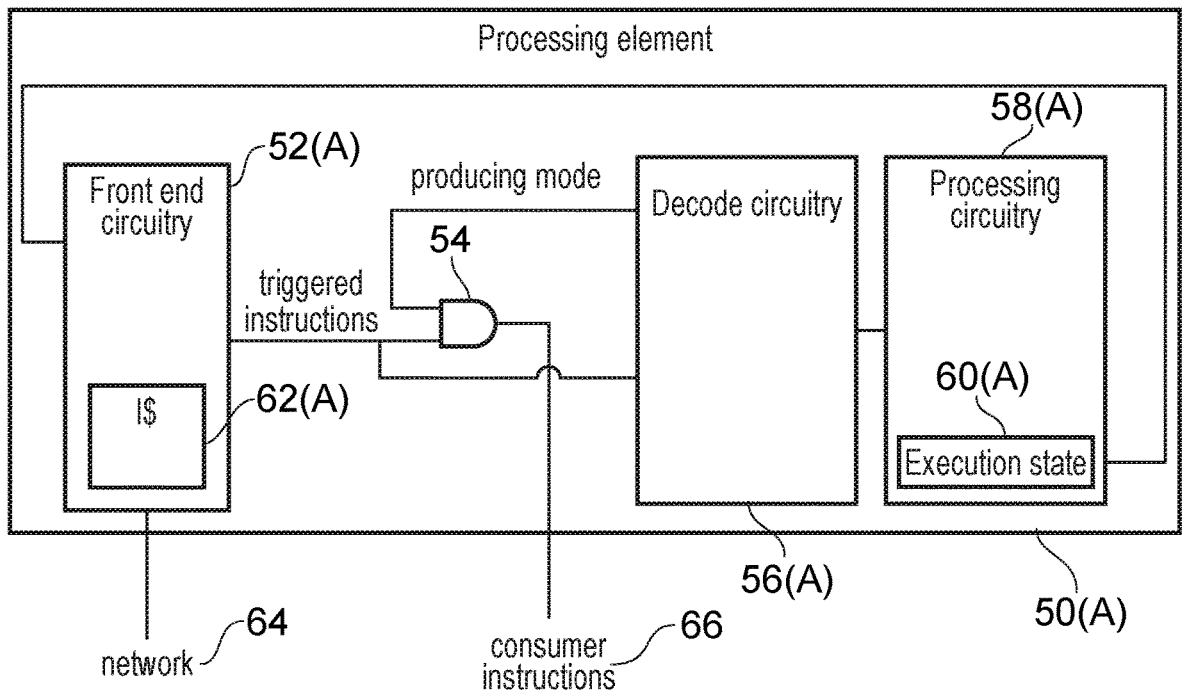
Figure 4B:
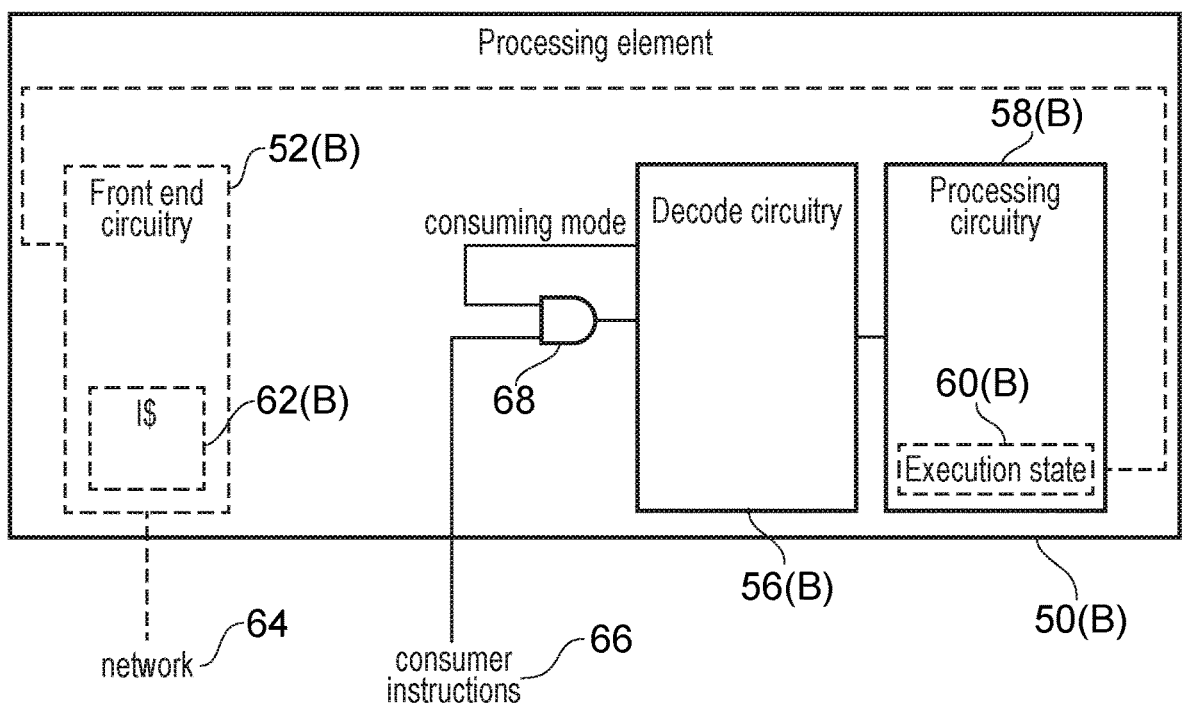
Figure 5A:
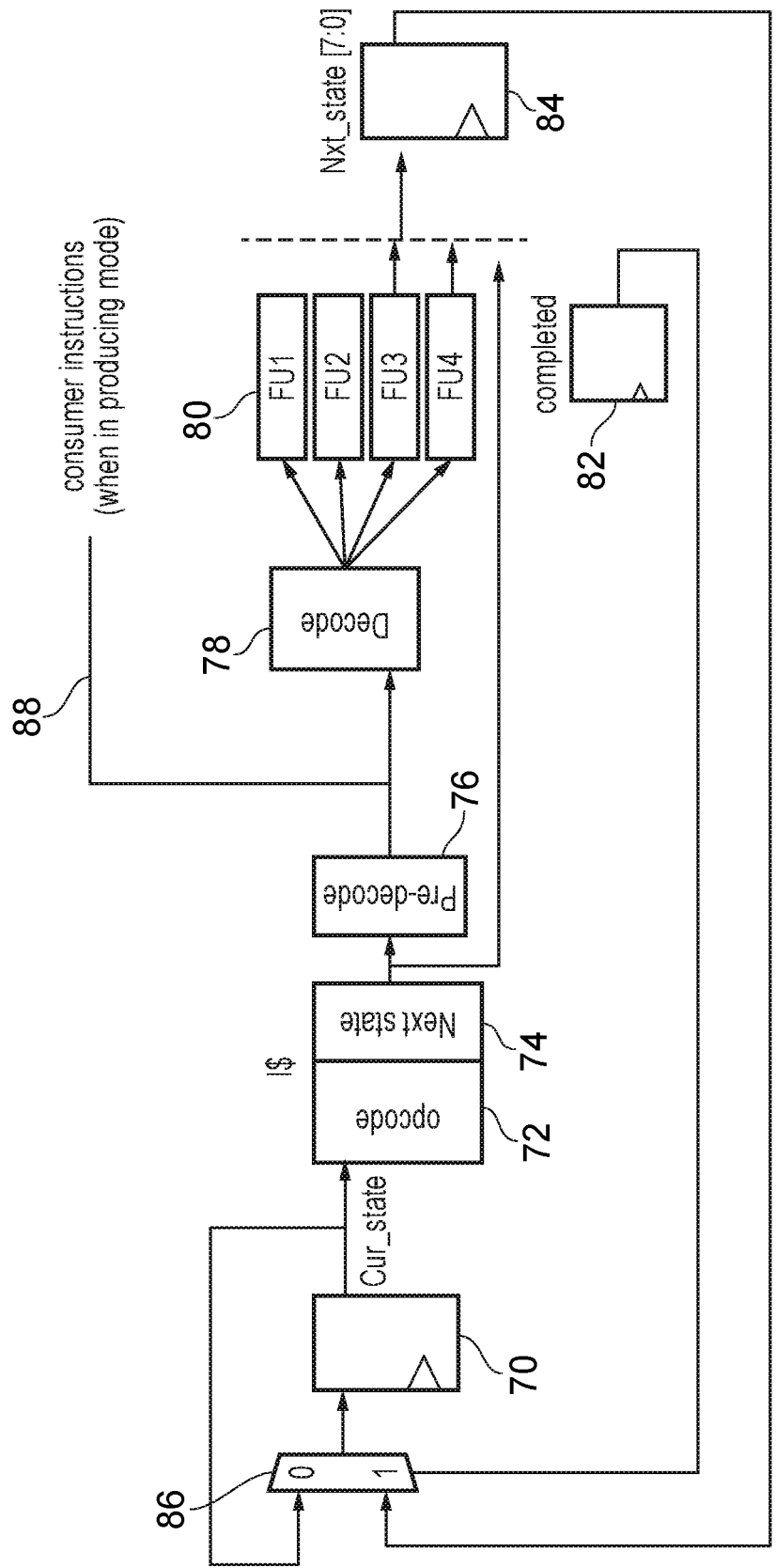
Figure 5B:
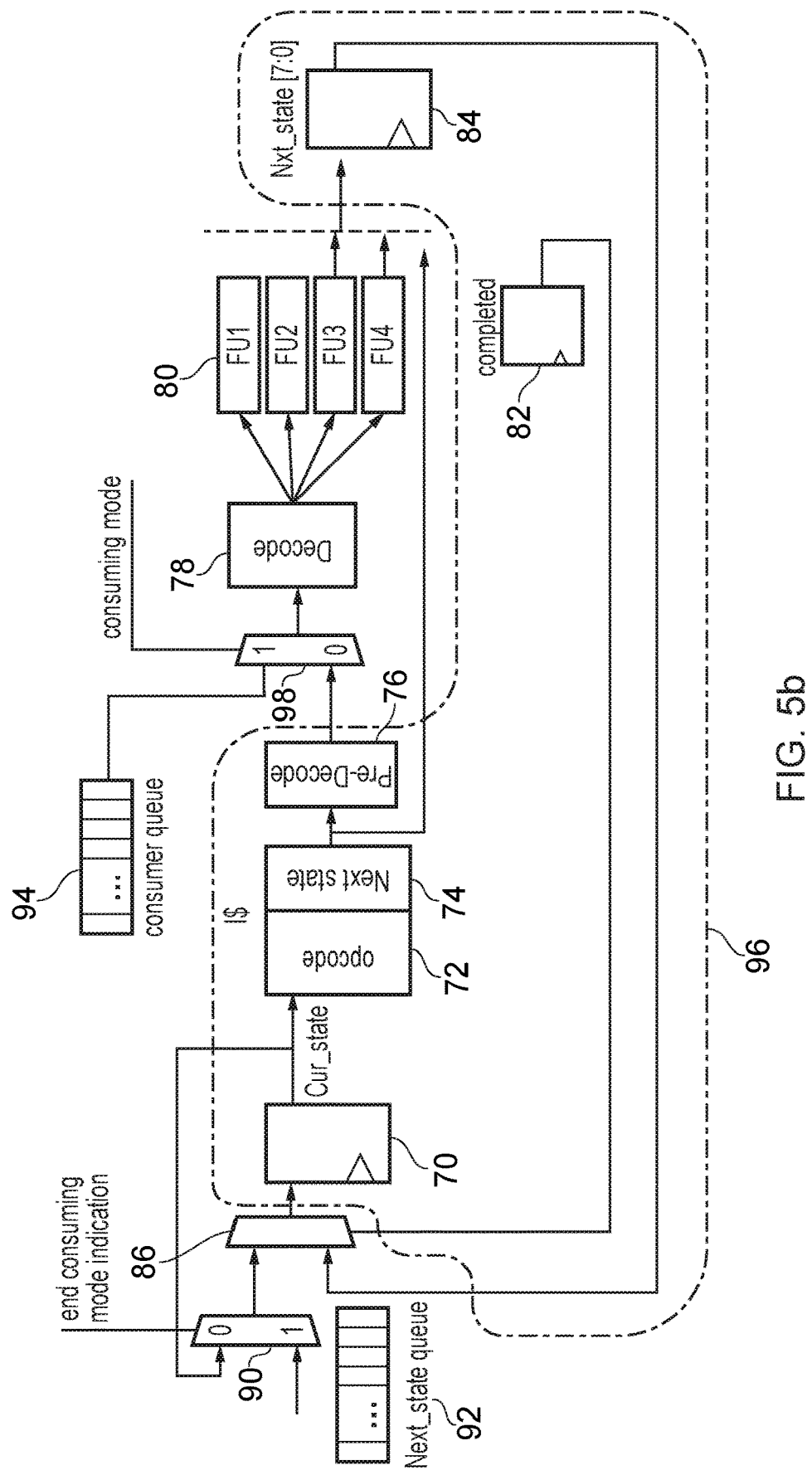
Figure 6:
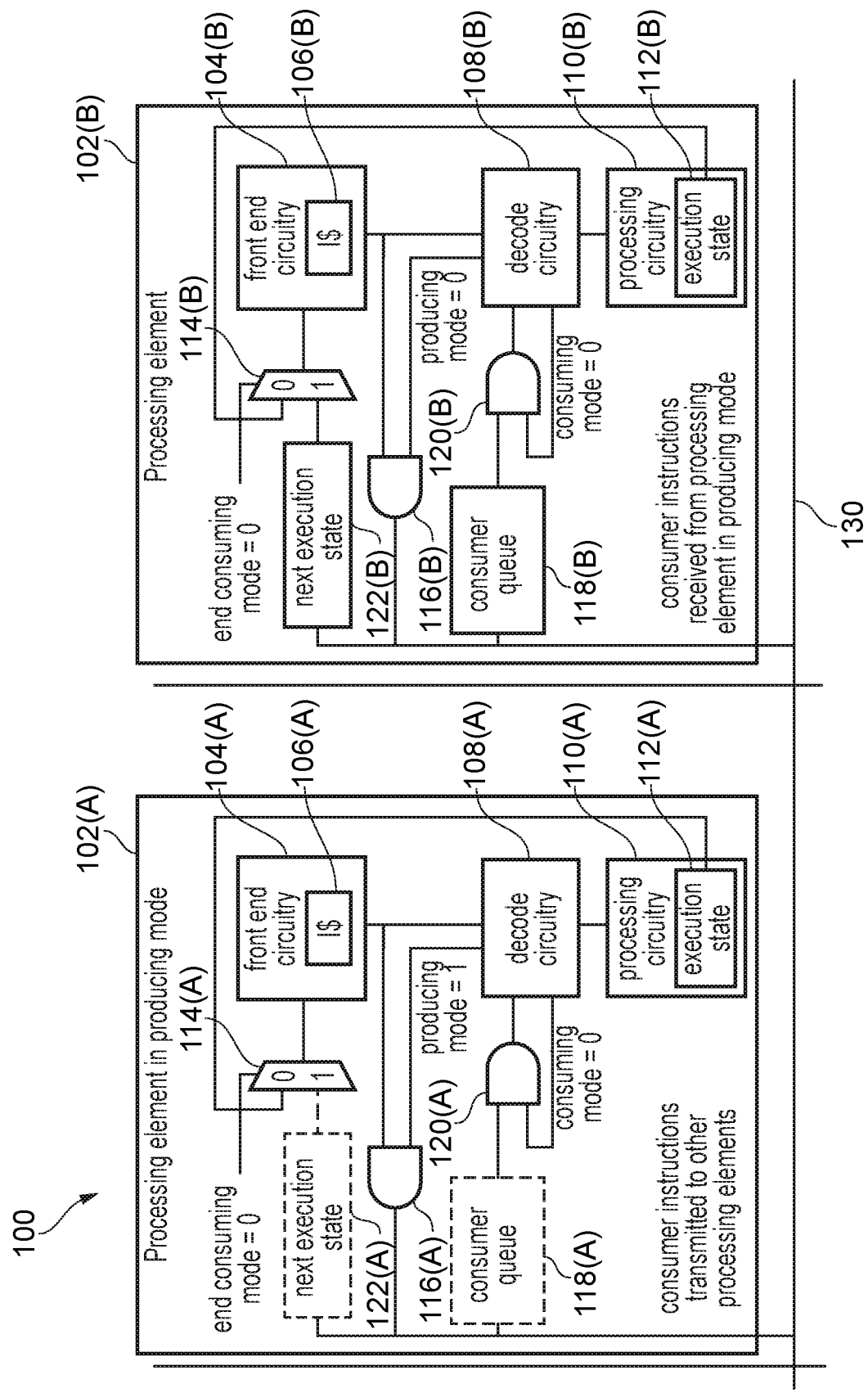
Figure 6:
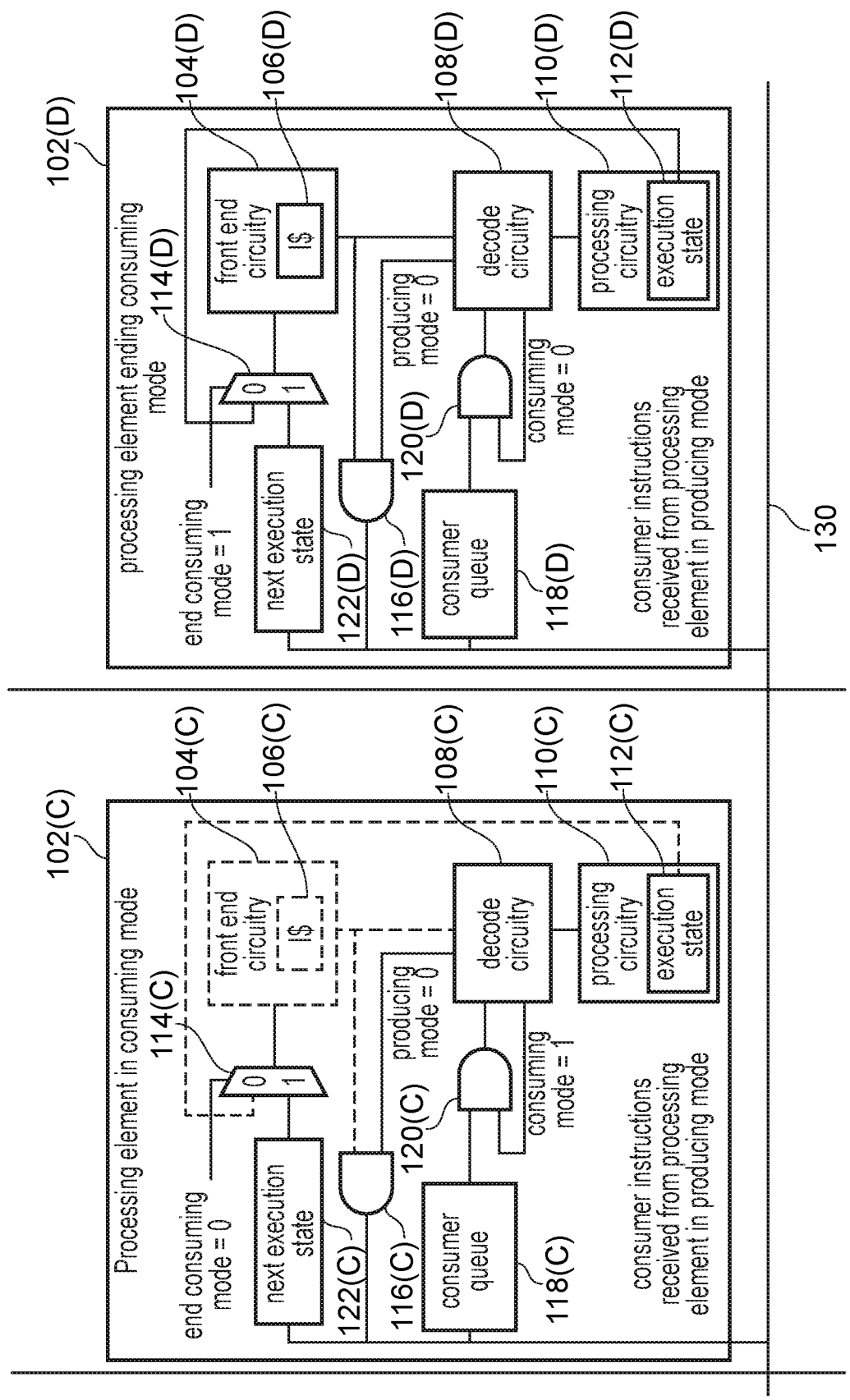
Figure 7:
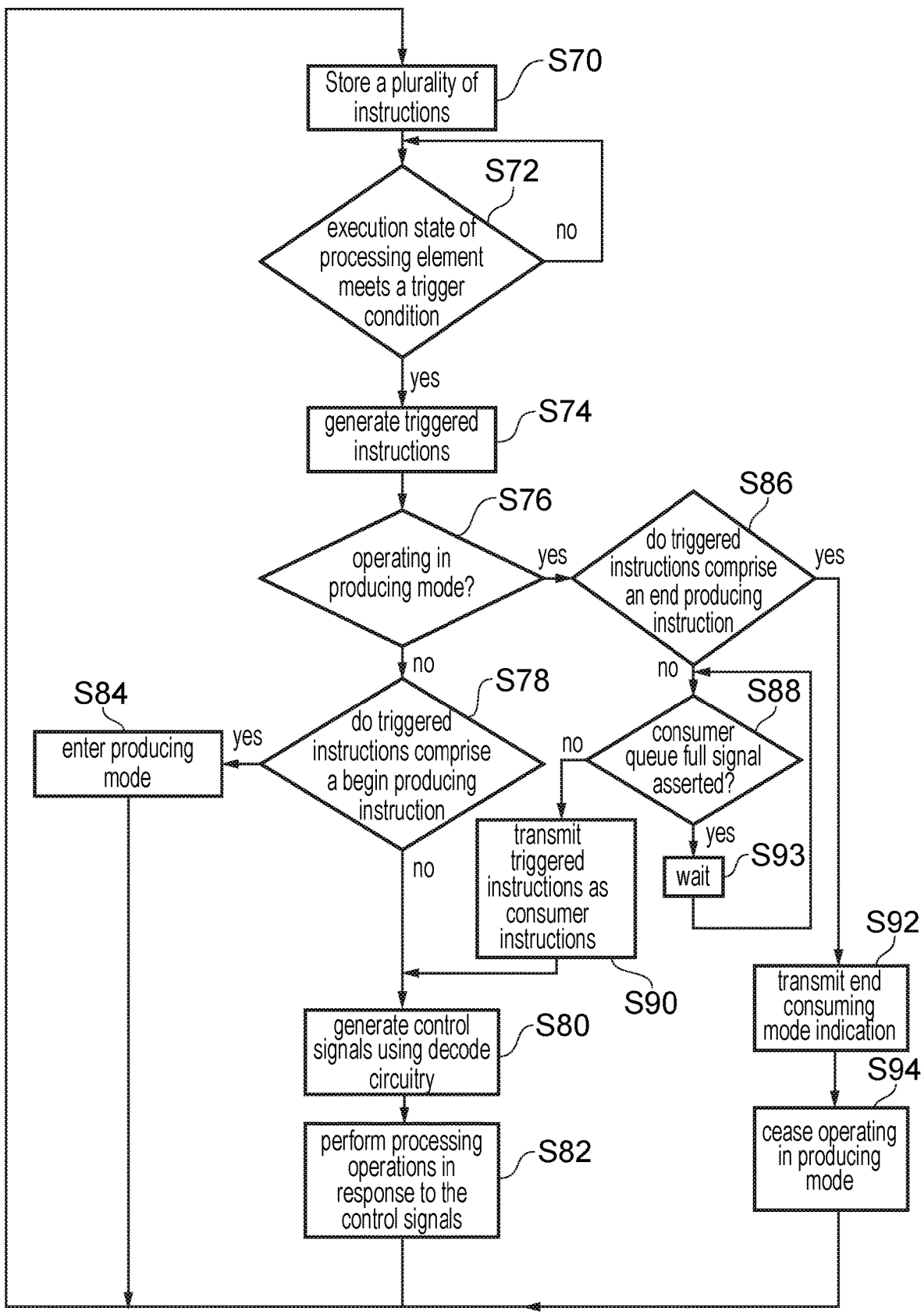
Figure 8:
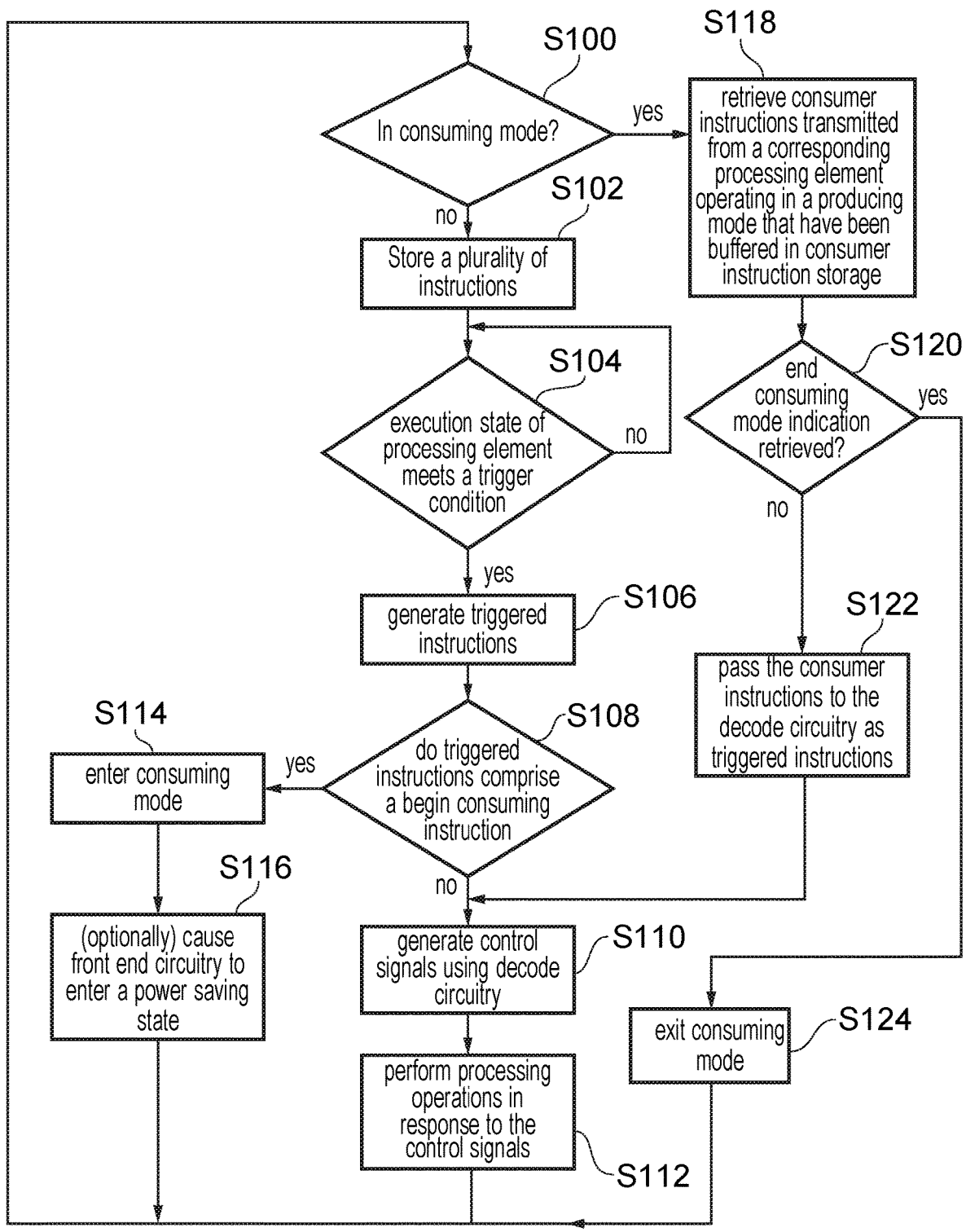

The present techniques will be described further, by way of example only, with reference to embodiments thereof as illustrated in the accompanying drawings, in which:

FIG. 1 schematically illustrates a data processing apparatus comprising a plurality of processing elements arranged on a single chip to form a spatial architecture according to various configurations of the present techniques;

FIG. 2 schematically illustrates operation of processing elements of a data processing apparatus according to various configurations of the present techniques;

FIG. 3a schematically illustrates a data processing apparatus comprising a plurality of processing elements according to various configurations of the present techniques;

FIG. 3b schematically illustrates a data processing apparatus comprising a plurality of processing elements according to various configurations of the present techniques;

FIG. 4a schematically illustrates a data processing apparatus operating in a producing mode according to various configurations of the present techniques;

FIG. 4b schematically illustrates a data processing apparatus operating in a consuming mode according to various configurations of the present techniques;

FIG. 5a schematically illustrates a data processing apparatus operating in a producing mode according to various configurations of the present techniques;

FIG. 5b schematically illustrates a data processing apparatus operating in a consuming mode according to various configurations of the present techniques;

FIG. 6 schematically illustrates a data processing apparatus comprising a plurality of processing elements according to various configurations of the present techniques;

FIG. 7 schematically illustrates a sequence of steps carried out by a processing element capable of operating in a producing mode according to various configurations of the present techniques; and FIG. 8 schematically illustrates a sequence of steps carried out by a processing element capable of operating in a consuming mode according to various configurations of the present techniques.

In some configurations there is provided a data processing apparatus. The data processing apparatus comprises a plurality of processing elements connected via a network on a single chip arranged to form a triggered spatial architecture. Each processing element of the plurality of processing elements comprises front end circuitry that is configured to process a plurality of instructions. The front end circuitry is also configured to generate triggered instructions, where each triggered instruction is generated in response to an execution state of the processing element meeting a trigger condition associated with one of the plurality of instructions. Each processing element is also provided with decode circuitry to, in response to receiving the triggered instructions, generate control signals; and execution circuitry configured to, in response to the control signals, perform processing operations and modify the execution state of the processing element. The decode circuitry is configured to, in response to a begin producing instruction, generate begin producing control signals to control the processing element to operate in a producing mode. The processing element is configured to, when operating in the producing mode, transmit the triggered instructions as consumer instructions to a set of processing elements of the plurality of processing elements, the consumer instructions to be executed by each of the set of processing elements when operating in a consuming mode.

Unlike a typical architecture, where instruction order is determined based on a program counter, processing elements of a triggered spatial architecture comprise front end circuitry to generate triggered instructions in response to a processing state of the processing element meeting a trigger condition, associated with each instruction. The front end circuitry passes the triggered instructions to the decode circuitry which generates control signals to cause the processing circuitry to perform the processing operations. Furthermore, on completion of a processing operation the processing circuitry is configured to update the processing state. In this way the front end circuitry is able to generate triggered instructions in response to a current indication of a processing state of the processing circuitry. As a result, each processing element of the triggered spatial architecture is able to operate independently from, and asynchronously with, the other processing elements of the triggered spatial architecture. Where multiple processing elements of the spatial architecture are tasked with performing a same set of operations in a same order, but (optionally) with different bits of data, each set of front end circuitry associated with each processing element must perform the task of determining, based on the processing state of the processing element, when to generate triggered instructions.

The inventors have realised that, when this is the case, there is a potential to share the front end circuitry amongst each of the plurality of tiles that is performing the same set of operations. For this reason, the decode circuitry of the processing elements is configured to respond to a begin producing instruction by placing the processing element into a producing mode. The begin producing instruction is part of the instruction set architecture and is associated with a particular opcode that is interpreted by the decode circuitry in order to produce the required control signals to control the processing element to operate in the producing mode. When in the producing mode, the front end circuitry of the processing element operates as previously described to produce triggered instructions when a processing state of the processing circuitry meets a trigger condition associated with one of the plurality of instructions. However, in addition to passing the triggered instructions to the decode circuitry, the processing element is configured to transmit (broadcast), via the network, the triggered instructions as consumer instructions. The consumer instructions may be transmitted in the same format as the triggered instructions such that they are in an appropriate format to be used directly by decode circuitry of the other processing elements. Alternatively, the consumer instructions may be compressed and transmitted as groups of instructions or with additional metadata, for example, to indicate which processing elements are to receive the consumer instructions. The consumer instructions can then be executed by each of a set of processing elements when operating in a consuming mode. The set of processing elements may receive the consumer instructions at the time of transmission and execute them without delay. However, the set of processing elements need not be operating in the consuming mode at the time of transmission. Rather, the set of processing elements may each enter the consuming mode at some time, independent of (asynchronous from) the time at which the processing element entered the producing mode. Specifically, some of the set of processing elements may already be in the consuming mode waiting for consumer instructions. Alternatively, some of the set of processing elements may not yet have entered the consuming mode and, at a future point after the processing element in the producing mode has transmitted the instructions (and potentially after the processing element operating in the producing mode has exited the producing mode), may enter the consuming mode and execute the consumer instructions. In this way the processing elements are able to maintain their asynchronous operation, but can share the triggered instructions generated by the processing element that is operating in the producing mode.

The duration of the producing mode can be defined in various ways, but in some configurations the decode circuitry is configured to, in response to an end producing instruction, generate end producing control signals to control the processing element to cease operating in the producing mode. The end producing instruction is part of the instruction set architecture and is associated with a particular opcode that is interpreted by the decode circuitry in order to produce the required control signals to control the processing element to cease operating in the producing mode. In this way the programmer is afforded a greater degree of flexibility in controlling the operational mode of the processing element. Alternatively, in some configurations the begin producing instruction specifies a number of instructions for which the processing element remains in the producing mode. This alternative allows for the processing element to be provided with the described functionality, whilst only providing a single dedicated instruction to control whether the processing element is in the producing mode.

The set of processing elements operating in the consumer mode can determine that the processing element has exited the producing mode by detecting an absence of transmitted consumer instructions. However, in some configurations the decode circuitry is configured to, in response to the end producing mode instruction, transmit an end consuming mode indication to the set of processing elements. This provides a direct indication that the functionality of the front end circuitry is being transferred back to the processing elements operating in the consuming mode and the processing elements operating in consumer mode can take action to cease operating in the consuming mode. In some configurations the end consuming mode indication is a dedicated instruction. However, in alternative configurations the end of consuming mode indication comprises an end consuming mode tag appended to a final consumer instruction transmitted to the set of processing elements. The end consuming mode tag can take any form, but in some configurations could be a single bit appended to the final consumer instruction.

The processing elements are configured to operate asynchronously such that a processing element is able to operate in the producing mode and is able to transmit consumer instructions, whilst processing elements of the set of processing elements continue to decode triggered instructions generated by their own front end circuitry. In some configurations, when in the producing mode, the processing element is configured to pause generation of triggered instructions in response to a consumer queue full signal received from one of the set of processing elements. The processing element operating in the processing mode continues to transmit consumer instructions. These instructions are buffered such that each of the set of processing elements is able to retrieve the instructions for execution when that processing element is operating in the consuming mode. In order to avoid buffer overruns it the producing processing elements are responsive to the consumer queue full signal. This signal is asserted (for example, set to logical 1) when the consumer queue is full but is cleared (for example, set to logical 0) when the queue has capacity (for example, the queue has space for one or more further consumer instructions).

The processing state of the processing element can be defined in various ways. However, in some configurations the processing element further comprises execution state storage circuitry to store the execution state; and the front end circuitry is configured to determine, for each instruction of the plurality of instructions, whether the execution state of the processing element meets an associated trigger condition by comparing the execution state with an expected execution state corresponding to that instruction. In some configurations the execution state storage circuitry is one or more dedicated registers configured to store execution states that are set in response to completed instructions. In other configurations the execution storage circuitry is one or more general purpose registers or one or more predicate registers accessible to the processing circuitry and the front end circuitry.

The consumer instructions are transmitted from the processing element in the producing mode to the set of processing elements in a variety of ways. In some configurations the consumer instructions are transmitted via the network. This approach minimises the need for additional circuitry and produces a compact design. In alternative configurations the data processing apparatus further comprises a producer-consumer communication network independent from the network, wherein the consumer instructions are transmitted via the producer-consumer communication network. This approach provides independence of the transmission of consumer instructions from other data transactions occurring on the network and prevents the consumer instructions being delayed due to network traffic.

In some configurations, in addition to being responsive to the begin producing instruction, the decode circuitry is configured to, in response to a begin consuming instruction, generate begin consuming control signals to control the processing element to operate in the consuming mode; and the processing element is configured to, when operating in the consuming mode, retrieve consumer instructions transmitted from a corresponding processing element operating in the producing mode, and pass the consumer instructions to the decode circuitry as triggered instructions. The begin consuming instruction is part of the instruction set architecture and is associated with a particular opcode that is interpreted by the decode circuitry in order to produce the required control signals to control the processing element to operate in the consuming mode. When operating in the consuming mode the processing element switches from generating its own triggered instructions to retrieve (obtain) consumer instructions and to use these instructions as triggered instructions. Hence, in consuming mode operation of the front end circuitry is paused. The consumer instructions are decoded by the decode circuitry and are executed as though they have been provided by the front end circuitry associated with that processing element.

Whilst configurations have been described in which the decode circuitry is responsive to a begin producing instruction and, optionally, a begin consuming instruction, in some configurations there is provided a data processing apparatus comprising a plurality of processing elements connected via a network on a single chip arranged to form a triggered spatial architecture. Each processing element of the plurality of processing elements comprises front end circuitry configured to process a plurality of instructions, and to generate triggered instructions. Each triggered instruction is generated in response to an execution state of the processing element meeting a trigger condition associated with one of the plurality of instructions. Each processing element further comprises decode circuitry configured to, in response to receiving the triggered instructions, generate control signals; and execution circuitry configured to, in response to the control signals, perform processing operations and modify the execution state of the processing element. The decode circuitry is configured to, in response to a begin consuming instruction, generate begin consuming control signals to control the processing element to operate in a consuming mode. The processing element is configured to, when operating in the consuming mode, retrieve consumer instructions transmitted from a corresponding processing element operating in a producing mode, and pass the consumer instructions to the decode circuitry as triggered instructions.

In some configurations the processing apparatus is provided with processing elements that are configured to operate in the producing mode and (optionally) the consuming mode. By providing processing elements that are operable in both the producing and consuming mode it is possible to provide a design with a high degree of flexibility. In other configurations the processing apparatus is provided with of the plurality of processing elements operable in only one of the producing and consuming modes. In other configurations the processing apparatus is provided with a first subset of processing elements operable in the producing mode and a second subset of processing elements operable in the consuming mode. By providing a first subset of processing elements operable in the producing mode and a second subset of processing elements operable in the consuming mode the amount of additional hardware provided can be kept to a minimum.

In some configurations, for processing elements that are configured to operate in the consuming mode, the processing element further comprises consumer instruction storage circuitry to buffer the consumer instructions transmitted from the corresponding processing element operating in the producing mode; and the processing element, when operating in the consuming mode, retrieves the consumer instructions from the consumer instruction storage circuitry. The consumer instruction storage can be provided in a variety of ways. In some example configurations a dedicated storage buffer can be provided for each processing element. Alternatively, in other example configurations, the consumer instruction storage is provided by local scratchpad storage provided for each processing element. In some example configurations the consumer instruction storage circuitry is a first in first out queue.

In some configurations processing elements that are capable of operating in the consuming mode are configured to, when the consumer instruction storage circuitry reaches capacity, transmit a consumer queue full signal to the corresponding processing element. In this way the processing element is configured to signal the corresponding processing element operating in the producing mode to prevent the corresponding processing element from transmitting further consumer instructions which could cause a buffer overrun at the processing element operating as a consumer.

When operating in the consuming mode the processing element is not using the front end circuitry. Hence, in some configurations the processing element is configured to, when operating in the consuming mode, cause the front end circuitry to enter a power saving state. In some configurations the option of entering the power saving state is hardwired into the processing element. In alternative configurations the power saving state is specified by the begin consuming instruction. In this way the programmer is provided with the option to determine whether the front end circuitry enters a power saving state, for example, based on a knowledge that the programmer may have regarding the number of instructions that are likely to be received by the processor when operating in the consuming mode.

The power saving state can be variously defined and is any state which causes the front end circuitry to consumer less power. In some configurations the processing element is configured to, when operating in the consuming mode, cause the front end circuitry to enter the power saving state by clock gating the front end circuitry. Clock gating the front end circuitry prevents an internal state of the front end circuitry from changing. Hence, a power usage of the front end circuitry is reduced whilst in this mode and the front end circuitry remains switched on and can exit from the power saving state with a low time and initialisation cost.

In some configurations the processing element is configured to, when operating in the consuming mode, cause the front end circuitry to enter the power saving mode by power gating the front end circuitry. Power gating the front end circuitry results in the front end circuitry being switched off and results in a larger power saving than clock gating. However, an initialisation time, or turn on power, associated with power gated circuitry may be higher and, hence, power gating may not be appropriate for processing elements entering a consuming mode for a small number of instructions. In some example configurations a choice of power saving states is provided and can be specified in the begin consuming instruction. In this way the programmer is provided with the option to determine a level of the power saving state providing a flexible configuration that can be used, by a programmer, to obtain an optimal level of power efficiency.

In some configurations the processing element is configured to, when operating in the consuming mode, detect an end consuming mode indication and, in response to detecting the end consuming mode indication, exit the consuming mode. As discussed in relation to processing elements operating in the producing mode, in some configurations the end consuming mode indication is provided as a discrete instruction (for example, to be interpreted by the decode circuitry of the processing element operating in the consuming mode). In alternative configurations the end consuming mode indication comprises an end consuming mode tag appended to a final consumer instruction transmitted by the corresponding processing element operating in the producing mode. In some example configurations the end consuming mode indication is interpreted directly by the decode circuitry to cause the processing element to exit the consuming mode. In alternative configurations the end consuming mode indication triggers the processing element to run an end consuming mode instruction as a triggered instruction. The end consuming mode instruction is part of the instruction set architecture and is interpreted by the decode circuitry of the processing element to generate control signals that cause the processing element to cease operating in (exit) the consuming mode.

In some configurations, when exiting the consuming mode, the processing element is configured to, when exiting the consuming mode, perform an initialisation routine to clear data from the front end circuitry. When the front end circuitry has been put into a power saving mode, for example, by applying clock gating or power gating to the front end circuitry, the front end circuitry may contain old data that is no longer relevant to the processing state of the processing element. Hence, the initialisation routine is used to clear old data from the front end circuitry and to cause the front end circuitry of the processing element to begin operating to generate triggered instructions based on a current processing state of the processing element.

During the consuming mode the processing element decodes and executes consumer instructions that are transmitted by the corresponding processing element when operating in the producing mode. Hence, when operating in the consuming mode the processing element does not need to keep track of a current execution state as this information is only required when the front end circuity is used to determine triggered instructions to be passed to the decode circuitry. For this reason, when exiting the consuming mode, the execution state of a processing element may be incorrect. Hence, in some example configurations the processing element further comprises next execution state storage to store a next execution state of the processing element; the processing element is configured to, when operating in the consuming mode and in response to detecting the end consuming mode indication, set the execution state of the circuitry to the next execution state. The next execution state is specified by the programmer and, in some example configurations, is included as part of the begin consuming instruction. As a result, the front end circuitry is able to obtain a state of the processing circuitry to be used when determining whether a trigger condition associated with an instruction has been met.

The next execution state storage can be provided in a variety of ways. In some configurations, the next execution state storage is provided as a single dedicated register indicating the execution state to be used when exiting the consuming mode. In some example configurations the next execution state storage is provided as a single register in which a memory location is recorded, the memory location providing the execution state to be used by the processing circuitry when exiting the consuming mode. In other example configurations the next execution state storage is arranged as a first in first out buffer configured to store a plurality of next execution states. In this way a sequence of next execution states can be provided to enable the processing element to determine the execution state to be used by the front end circuitry after a sequence of instances of operating in the consuming mode.

In some example configurations the processing element is configured to, when operating in the consuming mode, pass the consumer instructions to the decode circuitry as triggered instructions independent of the execution state of the processing element. When operating in consuming mode, the function of determining an order in which instructions are to be triggered is delegated to the corresponding processing element operating in the producing mode. The processing element operating in the consuming mode has no need to repeat this procedure and therefore can skip the steps associated with setting the execution state of the processing element. This provides a further means of saving power resulting in a power efficient design.

As discussed in relation to processing elements capable of operating in the producing mode, in some configurations the processing element further comprises execution state storage circuitry to store the execution state; and the front end circuitry is configured to determine, for a particular instruction, whether the execution state of the processing element meets the corresponding condition by comparing the execution state with an expected execution state corresponding to the particular instruction. In some configurations the execution state storage circuitry is one or more dedicated registers configured to store execution states that are set in response to completed instructions. In other configurations the execution storage circuitry is one or more general purpose registers or one or more predicate registers accessible to the processing circuitry and the front end circuitry.

Furthermore, and as discussed in relation to processing elements capable of operating in the producing mode, in some configurations the consumer instructions are transmitted via the network. In alternative configurations the data processing apparatus further comprises a producer-consumer communication network independent from the network, wherein the consumer instructions are transmitted via the producer-consumer communication network.

In some configurations the above described processing elements, which are capable of operating in the consuming mode, the decode circuitry is configured to, in response to a begin producing instruction, generate begin producing control signals to control the processing element to operate in the producing mode; and the processing element is configured to, when operating in the producing mode, transmit the triggered instructions as consumer instructions to a set of processing elements of the plurality of processing elements, the consumer instructions to be executed by each of the set of processing elements when operating in the consuming mode. Hence, configurations are provided in which processing elements can operate in a producing mode, a consuming mode, or in both the producing mode and the consuming mode. In each of these cases configurations are envisaged in which the processing elements, operating in the producing and/or the consuming mode, operate according to any of the above described configurations.

The corresponding processing element can be any processing element that is able to transmit consumer instructions to the plurality of processing elements. In some configurations the corresponding processing element is one of the plurality of processing elements. In such configurations the plurality of processing elements comprises both processing elements configured to operate in the producing mode and processing elements configured to operate in the consuming mode. In alternative configurations the corresponding processing element is an external processing element separate from the plurality of processing elements. In such configurations the external processing element can transmit consumer instructions to the processing elements to pre-populate a consumer queue as part of an initialization step. The corresponding processing element may be an external processing element that is provided on the single chip (for example, in a different power domain or in a different area of the chip). Alternatively, the external processing element may be provided on a separate chip that is distinct from (spatially separated from) the single chip. This eliminates the need for including processing elements capable of operating in the consuming mode in the spatial architecture.

Particular example configurations will now be described with reference to the accompanying drawings.

FIG. 1 schematically illustrates a data processing apparatus 10 arranged as a spatial architecture according to various examples of the present techniques. Spatial architectures can accelerate some applications by unrolling or unfolding the computations, which form the most time-consuming portion of program execution, in space rather than in time. Computations are unrolled in space by using a plurality of hardware units capable of concurrent operation. In addition to taking advantage of the concurrency opportunities offered by disaggregated applications which have been spread out on a chip, spatial architectures, such as data processing apparatus 10, also take advantage of distributed on-chip memories. In this way, each processing element is associated with one or more memory blocks in close proximity to it. As a result, spatial architectures can circumvent the von-Neumann bottleneck which hinders performance of many traditional architectures.

The data processing apparatus 10 comprises an array of processing elements which is connected to a cache hierarchy or main memory via interface nodes, which are otherwise referred to as interface tiles (ITs) and are connected to the network via multiplexers (X). Processing elements in the data processing apparatuses 10 according to the configurations described herein comprise two different types of circuitry. Each processing element comprises processing circuitry, otherwise referred to as compute tiles (CTs), and memory control circuitry, otherwise referred to as memory tiles (MTs). The role of the CTs is to perform the bulk of the data processing operations and arithmetic computations. The role of the MTs is to perform data accesses to locally connected memory (local storage circuitry) and data transfers to/from the more remote regions of memory and inter-processing element memory transfers between the processing element and other processing elements.

In some example configurations each of the processing elements of the data processing apparatus 10 comprises local storage circuitry connected to each memory control circuit (MT) and each memory control circuitry (MT) has direct connections to one processing circuit (CT). Each MT-CT cluster is connected to a network-on-chip which is used to transfer data between memory control circuits (MTs) and between each memory control circuit (MT) and the interface node (IT). In alternative configurations local storage circuitry is provided between plural processing elements and is accessible by multiple memory control circuits (MTs). The processing elements may be conventional processing elements. Alternatively, the processing elements may be triggered processing elements in which an instruction is executed when a respective trigger condition or trigger conditions is/are met.

The processing elements of the data processing apparatus 10 illustrated in FIG. 1 are each connected via a set of input and output channels to the network-on-chip which comprises switches, and data links between those switches forming a two-dimensional torus topological layout. Data can be routed around the network-on-chip using any algorithm. However, a particularly efficient routing algorithm is the xy routing algorithm modified to take the torus layout into account. The xy algorithm prevents routing deadlocks (cyclic dependence between processing elements and/or network resources which makes forward progress impossible) within the network by prohibiting data routed along the y direction from being subsequently routed along the x direction.

A subset of the processing elements, illustrated as part of the data processing apparatus 10, comprises processing elements that are capable of operating in a consuming mode and/or a producing mode. In more compact configurations some processing elements are only capable of operating on one of the producing mode and the consuming mode. In other more flexible configurations each of the processing element sin the subset of processing elements is able to operate in both the producing mode and the consuming mode. In some configurations the subset of the processing elements comprises all the processing elements.

FIG. 2 schematically illustrates a sequence of processing steps that are illustrative of a typical work flow carried out by a data processing apparatus configured to operate as a triggered spatial architecture. The spatial architecture is not illustrated in FIG. 2 and the processing circuitry and memory circuitry is laid out in order of the steps performed. The example considers mapping of an optical flow process for estimating motion mapped onto the spatial architecture. At step 12 two frames are provided: frame 1 and frame 2. These frames are passed via the multiplexor X to the spatial architecture. At step 14 the memory tiles MT0 and MT1 fetch the frames from the network and pass them to the corresponding compute tiles CT0, CT1 and CT2. Here, memory tiles and compute tiles that are common to a same processing element are assigned the same number. At step 16 compute tiles CT0, CT1 and CT2 calculate gradients (derivative filters and outer product). Then, at step 18, outer products are saved by memory tiles MT6-MT10 and, at step 20 integrals are computed by the corresponding compute tiles CT6-CT10. The precise computation details are unimportant, however, it is noted that, during runtime, many tiles execute the same piece of code. In particular, tiles CT0 and CT1 calculate the gradients using the same algorithm, apart from filter values saved in registers local to CT0, and CT1, the instructions executed are the same. Similarly, MT0-MT1 in step 14; MT6-MT10 in step 18; and CT6-CT10 in step 20 execute the same instructions during runtime. The inventors have realised that, due to the common instructions being executed on different processing elements, there is potential to share functionality amongst the processing elements. In particular, the steps prior to the instruction decoding on each processing element is common across all processing elements executing the same instruction.

FIG. 3a provides an overview of a data processing apparatus 30 according to various example configurations of the present techniques. The data processing apparatus 30 comprises a plurality of processing elements 32 connected via a network 34 on a single chip 42 arranged to form a triggered spatial architecture. Processing elements 32(1), 32(2) and 32(N) are illustrated. However, any number of processing elements 32 could be provided arranged in any conceivable spatial arrangement on the single chip 42. Each processing element 32 comprises front end circuitry 40 that is configured to process a plurality of instructions, and to generate triggered instructions. Each triggered instruction is generated by the front end circuitry 40 in response to an execution state of the processing element 32 meeting a trigger condition associated with one of the instructions. The processing element 32 is also provided with decode circuitry 38 to, in response to receiving the triggered instructions from the front end circuitry 40, generate control signals to cause processing circuitry 36 to, in response to the control signals, perform processing operations and modify the execution state of the processing element.

Any of the processing elements 32 of the data processing apparatus 30 can be arranged to operate in a producing mode in response to a begin producing instruction received by the decode circuitry 38. Processing elements 32 capable of operating in the producing more are configured to, when in the producing mode, transmit the triggered instructions generated by the font end circuitry 40 as consumer instructions to be executed by each of a set of processing elements configured to operate in a consuming mode. Similarly, any of the processing elements 32 of the data processing apparatus 30 can be arranged to operate in a consuming mode in response to a begin consuming instruction received by the decode circuitry 38. Processing elements 32 capable of operating in the consuming mode are configured to, when in the consuming mode, retrieve consumer instructions transmitted from a corresponding processing element operating in a producing mode and to pass the consumer instructions to the decode circuitry 38 as triggered instructions.

FIG. 3b provides an overview of a data processing apparatus 230 according to various example configurations of the present techniques. The data processing apparatus 230 comprises a plurality of processing elements 232 connected via a network 234 on a single chip 242 arranged to form a triggered spatial architecture. Processing elements 232(1), 232(2) and 232(N) are illustrated. However, any number of processing elements 232 could be provided arranged in any conceivable spatial arrangement on the single chip 242. Each processing element 232 comprises front end circuitry 240 that is configured to process a plurality of instructions, and to generate triggered instructions. Each triggered instruction is generated by the front end circuitry 240 in response to an execution state of the processing element 232 meeting a trigger condition associated with one of the instructions. The processing element 232 is also provided with decode circuitry 238 to, in response to receiving the triggered instructions from the front end circuitry 240, generate control signals to cause processing circuitry 236 to, in response to the control signals, perform processing operations and modify the execution state of the processing element.

The processing elements 232 of the data processing apparatus 230 can be arranged to operate in a consuming mode in response to a begin consuming instruction received by the decode circuitry 238. Processing elements 232 capable of operating in the consuming mode are configured to, when in the consuming mode, retrieve consumer instructions transmitted from a corresponding processing element operating in a producing mode and to pass the consumer instructions to the decode circuitry 238 as triggered instructions. In contrast to FIG. 3a the consumer instructions are provided from a corresponding processing element 200 operating in the producing mode that is separate from the plurality of processing elements 232. The corresponding processing element is arranged to operating in a producing mode and produces consumer instructions to be executed by the processing elements 232 when operating in the consumer mode to prepopulate a consumer queue as part of an initialization step.

FIGS. 4a and 4b provide further detail of processing elements operating in the producing mode and in the consuming mode. FIG. 4a schematically illustrates a processing element 50(A) comprising front end circuitry 52(A), decode circuitry 56(A) and processing circuitry 58(A). The front end circuitry comprises instruction cache 62(A) and is configured to generate triggered instructions when the execution state 60(A) of the processing circuitry 58(A) meets a trigger condition associated with one of the instructions stored in the instruction cache 62(A). The decode circuitry 56(A) receives the triggered instructions and generates control signals which are passed to the processing circuitry 58(A). The processing circuitry performs processing operations in response to the control signals and modifies the execution state 60(A) of the processing element. This information is then fed back to the front end circuitry 52(A) which determines if a further instruction is triggered through comparison of the execution state 60(A) to the trigger conditions of the instructions in the instruction cache.

When the decode circuitry 56(A) receives a begin producing instruction from the front end circuitry 52(A), the decode circuitry 56(A) causes the processing element 50(A) to enter the producing mode. The processing element 50(A) is configured to, when operating in producing mode, to pass the triggered instructions from the front end circuitry 52(A) to the decode circuitry 56(A) and cause the switch 54 to output the triggered instructions as consumer instructions 66. In this way the processing element 50(A) continues to generate triggered instructions independent as to whether the processing element is in the producing mode or not. However, when in the producing mode, the processing element 50(A) performs the additional function of passing the triggered instructions as consumer instructions. The consumer instructions 66 may be output via a dedicated communication channel or may be passed via the network 64.

FIG. 4b schematically illustrates a processing element 50(B) operating in the consuming mode. As in FIG. 4a, the processing element is provided with front end circuitry 52(B) comprising instruction cache 62(B). The processing element 50(B) is also provided with decode circuitry 56(B) and processing circuitry 58(B). When the processing element 50(B) is not operating in consuming mode, the operation of these elements is the same as has already been described. Hence, these details will be omitted here. When operating in the consuming mode, the processing element 50(B) switches operation such that triggered instructions are provided, via switch 68, from the consumer instructions 66 (for example, transmitted from processing element 50(A) and stored in consumer instruction storage circuitry). When operating in the consuming mode the decode circuitry 56(B) receives the consumer instructions 66 as triggered instructions and generates control signals to cause the processing circuitry 58(B) to perform processing operations. When operating in the consuming mode the execution state 60(B) and the front end circuitry 52(B) are not required and can (optionally) be placed into a power saving mode by clock gating or power gating these components. The consumer instructions 66 are illustrated as being received via a dedicated communication channel. However, in some configurations the consumer instructions may be passed via the network 64.

FIGS. 5a and 5b provide further details on the operation of the processing element in normal operation, in the producing mode, and in the consuming mode. First, the operation of a triggered processing element as set out in FIG. 5a when in normal operation (i.e., not in producing mode or consuming mode). The processing element comprise a current state latch 70 to latch a current execution state of the processing circuitry, an instruction cache 72, 74 to store a sequence of instruction opcodes 72 with corresponding trigger conditions and next state information 74 indicative of the next state that the processing element will reach upon successful execution of the corresponding instruction. The processing element further comprises pre-decode circuitry 76 to perform an initial pre-decoding step to split the instructions stored in the instruction cache 72, 74 into micro-operations suitable for processing in functional units 80. The processing element further comprises a next state latch 84 to store the next state that the processing circuitry will enter upon completion of the current instruction, and a completed latch 82 to latch an indication as to whether the instruction has been completed. Finally, the processing element comprises a switch (de-multiplexor) 86 to update the current state of the processing circuitry as stored in the current state latch 70 in response to the completion latch 82 indicating that the current instruction has completed. Together the current state latch 70, the instruction cache 72, 74, the pre-decode circuitry 76, the completed latch, and the next state latch form the front end circuitry responsible for generating triggered instructions based on a current execution state of the processing element.

In operation the processing element determines an instruction stored in the instruction cache 72, 74 to be the next triggered instruction based on the current execution state latched in the current state latch 70. If the current state latched in the current state latch 70 matches the trigger condition associated with an instruction stored in the instruction cache 72, 74 then that instruction is passed to the pre-decode circuitry 76 to be broken into micro-operations which are, in turn, passed to the decode circuitry 78 as triggered instructions. In addition, the instruction cache 72, 74 determines a corresponding next state 74 that is associated with the instruction for which the trigger condition is met. The next state 74 is passed to the next state latch 84. At this point the instruction is not complete and, hence, the completion latch stores an indication that this is the case. Hence, the current state latch 70 is not updated with the next state stored in the next state latch 84. Instead, the current state that is stored in the current state latch 70 is fed back, via the switch 86, to the input of the current state latch 70 and, in this way, the current state latch is maintained with the current execution state. The triggered instructions are passed to the decode circuitry 78 which generates control signals to cause the functional units 80 to perform processing operations based on the triggered instructions. When the processing operations are completed, an indication that the processing operations are completed is stored in the completion latch. In addition, outputs from the functional units 80 may be used to update the next state based on the operations carried out during processing. Once the processing element has latched, in the completion latch 82, that the processing has completed, the current state latch is updated to contain the value that was previously latched in the next state latch. The new current state, that is latched in the current state latch 70, can then be used by the processing element to determine a next instruction to be used to generate a triggered instruction. The processing element can also be modified to operate in a producing mode. In this case, when in the producing mode, the processing element outputs the triggered instructions as consumer instructions 88.

FIG. 5b schematically illustrates how the circuitry set out in FIG. 5a is modified to enable the processing element to operate in the consuming mode. Elements that are common to both the unmodified processing element of FIG. 5a and the modified processing element of FIG. 5b are assigned the same reference numerals. The processing element is also provided with next state queue 92 to provide an indication of a next execution state of the processing circuitry subsequent to the processing element exiting the consuming mode. The next state queue is fed into switch 86 via an additional switch 90. In combination switch 86 and switch 90 cause the current state latch 70 to take: the value of the next state queue when the end consuming mode indication is asserted and the completion state is not asserted; the value of the current execution state when the end consuming mode indication is not asserted and when the completion state is not asserted; and to take the value of the next execution state when the completion state is asserted (independent of the value of the end consuming mode indication). The processing element is further provided with a consumer queue 94 (consumer instruction storage) to buffer consumer instructions that are transmitted from a corresponding processing element operating in the producing mode. The consumer queue 94 stores consumer instructions which are fed, as triggered instructions, to the decode circuitry 78 via the switch 98 when the processing element is in consuming mode. When operating in the consuming mode the processing element has no need for the front end circuitry 96 which comprises the current state latch 70, the instruction cache 72, 74, the pre-decode circuitry 76, the next state latch 84, and the completion latch 82. Hence, in some configurations the processing element is configured to cause the front end circuitry 96 to be put into a power saving mode, for example, by power gating or clock gating the components in the front end circuitry 96.

FIG. 6 schematically illustrates a data processing apparatus 100 according to some example configurations. The data processing apparatus 100 comprises four processing elements 102. Each of the processing elements comprises the same circuitry and each is capable of operating in a normal mode (i.e., not in a producing mode or a consuming mode), a producing mode, and a consuming mode. The same components in each of the processing elements are each labelled with a same reference numeral with the letter, provided in parentheses, indicating the processing element to which the circuitry belongs. Each processing element 102 comprises front end circuitry 104 with instruction cache 106, decode circuitry 108, processing circuitry 110 with execution state storage 112, a next execution state queue 122, and a consumer instruction queue 118. Each processing element further comprises switch 114 and gates 116 and 120 to control the interaction between the different components in each of the different modes. Each processing element is also connected to the network 130. The circuitry within the processing elements is for illustrative purpose only. In some example configurations the processing elements are configured as set out in FIG. 6 with separate functional blocks for each of the front end circuitry 104, the decode circuitry 108, the processing circuitry 110, the next execution state queue 122, the consumer instruction queue 118, the switch 114 and the gates 116 and 120. However, in other example configurations any of these functional blocks can be combined into a single block providing the described functionality. Furthermore, the processing elements may be modified to incorporate any of the detailed features set out in FIGS. 4 and 5.

In the illustrated embodiment the data processing apparatus 100 comprises a first processing element 102(A) operating in the producing mode. When operating in the producing mode the processing element 102(A) does not use the next execution state queue 122(A) because the end consuming mode signal is set to 0, nor does the processing element 102(A) use the consumer queue 118(A) as the consuming mode signal is set to zero and, hence, the gate 120(A) is closed to the consumer queue 118(A). The front end circuitry 104(A) generates triggered instructions based on instructions stored in the instruction cache 106(A) and a current execution state 112(A) of the processing element 102(A). The generated instructions are output (transmitted), via gate 116(A) to the network 130 as consumer instructions. The triggered instructions are also passed to the decode circuitry 108(A). The decode circuitry 108(A) generates control signals to cause the processing circuitry 110(A) to process the triggered instructions and to update the execution state 112(A). In this way processing element 102(A) both processes triggered instructions and transmits the triggered instructions to the network 130 as consumer instructions.

The second processing element 102(B) is a processing element that is operating in a normal mode (i.e., it is not operating in a producing mode or in a consuming mode). The second processing element 102(B) receives consumer instructions from the network 130 and buffers these instructions in the consumer instruction queue 118(B). The second processing element 102(B) may also monitor the consumer instruction queue 118(B) and issue a consumer queue full indication to the first processing element 102(A) in response to detecting that the consumer queue 118(B) is full. The second processing element 102(B) also comprises next execution state storage 122(B) which may be used to store a next execution state of the second processing element 102(B) as an execution state to be set once the second processing element 102(B) enters and completes operating in a consuming mode. Whilst operating in the normal mode the gates 116(B) and 120(B) are each closed such that the second processing element 102(B) neither transmits consumer instructions nor retrieves consumer instructions for passing to the decode circuitry 108(B) as triggered instructions. In operation the second processing element 102(B) operates in the same manner as the first processing element 102(A) with the notable exception that it does not produce consumer instructions, but instead can buffer consumer instructions received from the network 130 for execution when the processing element subsequently enters the consuming mode.

The third processing element 102(C) is a processing element that is operating in the consuming mode. The third processing element 102(C) receives consumer instructions from the network 130 and buffers these instructions in the consumer instruction queue 118(C). The third processing element 102(C) may also monitor the consumer instruction queue 118(C) and issue a consumer queue full indication to the first processing element 102(A) in response to detecting that the consumer queue 118(C) is full. The third processing element 102(C) also comprises next execution state storage 122(C) which is used to store a next execution state of the third processing element 102(C) as an execution state to be set once the third processing element 102(B) completes operating in the consuming mode. When in the consuming mode, the gate 116(C) is closed so that the third processing element 102(C) is unable to generate consumer instructions. The gate 120(C) is open (consuming mode=1) so that the consumer instructions stored in the consumer instruction queue 118(C) are passed to the decode circuitry 108(C). The decode circuitry 108(C) receives the consumer instructions as triggered instructions and generates control signals to cause the processing circuitry 110(C) to perform processing operations according to the consumer instructions.

The fourth processing element 102(D) is a processing element that is ending the consuming mode. The fourth processing element 102(D) is transitioning from behaving in the same manner as the third processing element 102(C) to behaving in the same manner as the second processing element 102(B). As the processing element transitions from operating in the consuming mode, in response to completing the final consumer instruction issued by the first processing element 102(A) to operating in the normal mode, the end consuming mode signal is asserted (end consuming mode=1). This causes the switch 114(D) to take, as the current execution state of the processing element 102(D), the next execution state stored in the next execution state queue 122(D). The front end circuitry 104(D) then determines a next instruction in the instruction cache 106(D) to be used to generate a triggered instruction to be passed to the decode circuitry 108(D) and, hence, to control the processing circuitry 110(D).

FIG. 7 schematically illustrates a sequence of steps carried out by a processing element configured to operate in a producing mode according to some example configurations. The processing element is one of a plurality of processing elements arranged on a single chip to form a triggered spatial architecture. The method starts at step S70 where the processing element stores a plurality of instructions, for example, in an instruction cache associated with the processing element. The plurality of instructions is stored with a corresponding plurality of stored next execution states that the processing element is to enter on completion of the corresponding instructions. Flow then proceeds to step S72 where it is determined whether the execution state of a processing element meets a trigger condition associated with one of the plurality of instructions that is stored in the instruction cache. If no, then flow waits at step S72. If, at step S72, it is determined that the execution state of the processing element meets the trigger condition then flow proceeds to step S74, where the processing element generates triggered instructions to be passed to the decode circuitry and, when operating in producing mode, to be transmitted to a further set of processing elements connected to the processing element via the network.

Flow then proceeds to step S76 where it is determined whether the processing element is operating in producing mode. If, at step S76, it is determined that the processing element is not operating in producing mode then flow proceeds to step S78 where it is determined whether the triggered instructions comprise a begin producing instruction. If, at step S78, it is determined that the instructions comprise a begin producing instruction then flow proceeds to step S84 where the decode circuitry of the processing element generates control signals to cause the processing element to enter producing mode. Flow then returns to step S70. If however, at step S78, it is determined that the triggered instructions do not include a begin producing instruction then flow proceeds to step S80 where the decode circuitry generates control signals. Flow then proceeds to step S82 where the proceeding circuitry of the processing element performs processing operations in response to the control signals.

On the other hand, if at step S76 it was determined that the processing element is operating in the producing mode, then flow proceeds to step S86 where it is determined whether the triggered instructions comprise an end producing instruction. If yes, then flow proceeds to step S92 where the processing element transmits an end consuming indication to the further set of processing elements that are connected to the processing element to indicate to those processing elements that the processing element is ending the producing mode. Flow then proceeds to step S94 where the processing element ceases operating in producing mode. Flow then returns to step S70. If on the other hand it was determined, at step S86, that the triggered instructions do not comprise an end producing instruction then flow proceeds to step S88 where it is determined if the consumer queue full signal is asserted. If, at step S88, it is determined that the consumer queue full signal is asserted then flow proceeds to step S92 where the processing element waits (pauses) for a predetermined length of time. Flow then returns to step S88 to determine if the consumer queue full signal is still asserted. If, at step S88, it is determined that the consumer queue full signal is not asserted then flow proceeds to step S90 where the triggered instructions are transmitted, as consumer instructions, to the further set of processing elements. Flow then proceeds to step S80 where the processing element generates control signals using decode circuitry. Flow then proceeds to step S82 where processing operations are performed by the processing element in response to the control signals. Flow then returns to step S70.

FIG. 8 schematically illustrates a sequence of steps carried out by a processing element according to some example configurations. The processing element is one of a plurality of processing elements arranged on a single chip to form a triggered spatial architecture. Flow begins at step S100 where it is determined whether the processing element is operating in consuming mode. If it is determined that the processing element is not operating in consuming mode then flow proceeds to step S102 where the processing element stores a plurality of instructions, for example, in an instruction cache associated with the processing element. The plurality of instructions is stored with a corresponding plurality of stored next execution states that the processing element is to enter on completion of the corresponding instructions. Flow then proceeds to step S104 where it is determined whether the execution state of a processing element meets a trigger condition associated with one of the plurality of instructions that is stored in the instruction cache. If no, then flow waits at step S104. If, at step S104, it is determined that the execution state of the processing element meets the trigger condition then flow proceeds to step S106, where the processing element generates triggered instructions to be passed to the decode circuitry and, when operating in producing mode, to be transmitted to a further set of processing elements connected to the processing element via the network.

Flow then proceeds to step S108 where it is determined whether the triggered instructions comprise a begin consuming instruction. If it is determined that the triggered instructions comprise a begin consuming instruction, then flow proceeds to step S114 where the processing element enters consuming mode. For example, the decode circuitry generates control signals to cause the processing element to operate in the consuming mode. Flow then proceeds to step S116 where (optionally) the processing element causes the front end circuitry to enter a power saving state. The power saving state could, for example, be specified by the begin consuming instruction. Flow then returns to step S100. Alternatively, if at step S108 it was determined that the triggered instructions do not comprise a begin consuming instruction then flow proceeds to step S110 where the decode circuitry of the processing element generates control signals. Flow then proceeds to step S112 where the processing element performs processing elements in response to the control signals. Flow then returns to step S100.

If, at step S100, it was determined that the processing element is operating in consuming mode where flow proceeds to step S118. At step S118 the processing element retrieves consumer instructions that have been transmitted from a corresponding processing element that is operating in a producing mode and that have been buffered in consumer instruction storage associated with the processing element. Flow then proceeds to step S120 where it is determined whether the retrieved instructions comprise an end consuming mode indication. If it is determined that an end consuming mode indication has been retrieved, then flow proceeds to step S124 where the processing element exits the consuming mode. For example, the decode circuitry generates control signals, based on the end consuming mode indication, that cause the processing element to exit the consuming mode. Flow then returns to step S100.

Alternatively, if at step S120 it was determined that the retrieved consumer instructions do not comprise an end consuming indication then flow proceeds to step S122 where the consumer instructions are passed to the decode circuitry as triggered instructions. Flow then proceeds to step S110 where the decode circuitry of the processing element generates control signals. Flow then proceeds to step S112 where the processing element performs processing elements in response to the control signals. Flow then returns to step S100.

As a concrete example, a processing element may be configured to, when operating in a normal mode (not operating in a producing mode or a consuming mode), perform operations as set out in the following pseudo code:

```
#Recieving data input
when %p == 0000_0000 with %i0.0:
    mov.h %r0, %i0; deq %i0;          set %p = 0000_0001;
#squaring inputs (multiply %r0 by %r0 and store in %r1)
when %p == 0000_0001:
    mul.h %r1, %r0, %r0;              set %p = 0000_0010;
#Division (divide the contents of %r1 by %r2)
when %p == 0000_0010:
    sdiv.h %r3, %r1, %r2;             set %p = 0000_0011;
#Sending data to other tiles
when %p == 0000_0011:
    mov.h %o0, %r3;                   set %p = 0000_0100;
#CT comes to a natural halt
when %p == 0000_0100:
    hlt;
```

In the above code %p denotes the execution state of the circuitry, %i0 denotes the input channel, %o0 denotes the output channel, and $r0, %r1, . . . denote registers associated with the processing element. The code therefore receives a data value on the input channel %i0.0 and dequeues the data. The input data is then squared and divided by another value. The result is stored in register %r3 and is then transmitted via an output channel before the processing element comes to a halt. The structure of each step is the same. The processing element waits until the execution state of the circuitry meets a desired condition. Then an instruction is performed. Finally, the execution state of the processing element is set to a new value thereby enabling a further instruction to be triggered.

When the above code is run by a number of processing elements it may be beneficial to only perform the steps associated with checking and setting the execution state on a single processing element. According to various configurations disclosed herein a processing element can operate in a producing mode and could, for example, execute the following instruction sequence

```
when %p == 0000_0000:
    begin_producing %o0;              set %p = 0000_0001;
# Processing element is now operating in the producing mode. The
# following instructions are run on the processing element and are
# transmitted as consumer instructions to a further set of
processing elements
#Recieving data input
when %p == 0000_0001 with %i0.0:
    mov.h %r0, %i0; deq %i0;          set %p = 0000_0010;
#squaring inputs (multiply %r0 by %r0 and store in %r1)
when %p == 0000_0010:
    mul.h %r1, %r0, %r0;              set %p = 0000_0011;
#Division (divide the contents of %r1 by %r2)
when %p == 0000_0011:
    sdiv.h %r3, %r1, %r2;             set %p = 0000_0100;
#Sending data to other tiles
when %p == 0000_0100:
    mov.h %o0, %r3;                   set %p = 0000_0101;
# Exit producing mode
when %p == 0000_0101:
    end_producing %o0;                set %p = 0000_0110;
#CT comes to a natural halt
when %p == 0000_0110:
    hlt;
```

The above pseudo code is the same as the pseudo code that is run by the processing element operating in a normal mode (not a producing mode or a consuming mode). However, the code has been modified to include a begin producing instruction and an end producing instruction to cause the processing element to operate in a producing mode during execution of the intervening instructions. The intervening instructions are transmitted, via output channel %o0 in this example to be used by other processing elements. The processing elements to which the consumer instructions are transmitted may be specified in advance or as part of the begin producing instruction.

On the consumer side, the instructions are received like normal data via the network (alternatively, in other example configurations a dedicated channel could be used). The instructions are buffered in local consumer instruction storage to be used when the processing element enters the consuming mode. In some configurations the ".tail" attribute can be used to indicate an end of instructions that are received from the corresponding processor operating in the consumer mode. The receiving processing element stores the received instructions in consumer instruction queue ending with an end consuming instruction. At some later point the receiving processor may execute a begin consuming instruction causing the receiving processing element to retrieve the consumer instructions from the consumer instruction storage and to pass the instructions to the decode circuitry as triggered instructions. When the processing element has completed executing the stored instructions, the final instruction that is executed is the end consuming instruction. The end consuming instruction causes the processing element to retrieve a next execution state from the next execution state queue and resumes normal processing duties. In some example configurations the processing element may exit consuming mode using the following instruction:

```
when %p == 0000_0000 with %i0.tail:
    end_consuming;  deq %i0;    set %p = <<next state
    from next state queue>> ;
```

In some example configurations the processing element may enter consuming mode using the following instruction:

```
when %p == 0000_0001 with %i0:
    begin_consuming; deq %i0;
```

The begin consuming instruction is executed to cause the processing element to operate in the consuming mode. Subsequent to completing the execution of consumer instructions in the consuming mode, the processing element sets the execution state of the processor to the next state which is retrieved from the next state queue.

In brief overall summary there is provided a data processing apparatus and a method of operating a data processing apparatus. The data processing apparatus comprises a plurality of processing elements connected via a network on a single chip arranged to form a triggered spatial architecture. Each processing element comprises front end circuitry configured to generate triggered instructions which are passed to decode circuitry to cause the processing element to perform processing operations. Some processing elements are configured to operate in a producing mode in which the processing element transmits the triggered instructions as consumer instructions to be executed by each of a set of processing elements when operating in a consuming mode. Some processing elements are configured to operate in the consuming mode in which the processing elements retrieve consumer instructions transmitted from a processing element operating in a producing mode, and pass the consumer instructions to the decode circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising a plurality of processing elements connected via a network on a single chip arranged to form a triggered spatial architecture, each processing element of the plurality of processing elements comprising:
front end circuitry configured to process a plurality of instructions, and to generate triggered instructions, each triggered instruction generated in response to an execution state of the processing element meeting a trigger condition associated with one of the plurality of instructions;
decode circuitry configured to, in response to receiving the triggered instructions, generate control signals; and
execution circuitry configured to, in response to the control signals, perform processing operations and modify the execution state of the processing element,
wherein:
the decode circuitry is configured to, in response to a begin consuming instruction, generate begin consuming control signals to control the processing element to operate in a consuming mode; and
the processing element is configured to, when operating in the consuming mode, retrieve consumer instructions transmitted from a corresponding processing element operating in a producing mode, and pass the consumer instructions to the decode circuitry as triggered instructions.

2. The data processing apparatus of claim 1, wherein:
the processing element further comprises consumer instruction storage circuitry to buffer the consumer instructions transmitted from the corresponding processing element operating in the producing mode; and
the processing element, when operating in the consuming mode, retrieves the consumer instructions from the consumer instruction storage circuitry.

3. The data processing apparatus of claim 2, wherein the consumer instruction storage circuitry is a first in first out queue.

4. The data processing apparatus of claim 2, wherein the processing element is configured to, when the consumer instruction storage circuitry reaches capacity, transmit a consumer queue full signal to the corresponding processing element.

5. The data processing apparatus of claim 1, wherein the processing element is configured to, when operating in the consuming mode, cause the front end circuitry to enter a power saving state.

6. The data processing apparatus of claim 1, wherein the processing element is configured to, when operating in the consuming mode, detect an end consuming mode indication and, in response to detecting the end consuming mode indication, exit the consuming mode.

7. The data processing apparatus of claim 6, wherein the end consuming mode indication comprises an end consuming mode tag appended to a final consumer instruction transmitted by the corresponding processing element operating in the producing mode.

8. The data processing apparatus of claim 6, wherein the processing element is configured to, when exiting the consuming mode, perform an initialisation routine to clear data from the front end circuitry.

9. The data processing apparatus of claim 6, wherein:
the processing element further comprises next execution state storage to store a next execution state of the processing element;
the processing element is configured to, when operating in the consuming mode and in response to detecting the end consuming mode indication, set the execution state of the circuitry to the next execution state.

10. The data processing apparatus of claim 9, wherein the next execution state storage is arranged as a first in first out buffer configured to store a plurality of next execution states.

11. The data processing apparatus of claim 1, wherein the processing element is configured to, when operating in the consuming mode, pass the consumer instructions to the decode circuitry as triggered instructions independent of the execution state of the processing element.

12. The data processing apparatus of claim 1, wherein:
the processing element further comprises execution state storage circuitry to store the execution state; and
the front end circuitry is configured to determine, for a particular instruction, whether the execution state of the processing element meets the corresponding condition by comparing the execution state with an expected execution state corresponding to the particular instruction.

13. A data processing apparatus comprising a plurality of processing elements connected via a network on a single chip arranged to form a triggered spatial architecture, each processing element of the plurality of processing elements comprising:
front end circuitry configured to process a plurality of instructions, and to generate triggered instructions, each triggered instruction generated in response to an execution state of the processing element meeting a trigger condition associated with one of the plurality of instructions;
decode circuitry configured to, in response to receiving the triggered instructions, generate control signals; and
execution circuitry configured to, in response to the control signals, perform processing operations and modify the execution state of the processing element, wherein:
the decode circuitry is configured to, in response to a begin producing instruction, generate begin producing control signals to control the processing element to operate in a producing mode; and
the processing element is configured to, when operating in the producing mode, transmit the triggered instructions as consumer instructions to a set of processing elements of the plurality of processing elements, the consumer instructions to be executed by each of the set of processing elements when operating in a consuming mode.

14. The data processing apparatus of claim 13, wherein the decode circuitry is configured to, in response to an end producing instruction, generate end producing control signals to control the processing element to cease operating in the producing mode.

15. The data processing apparatus of claim 14, wherein the decode circuitry is configured to, in response to the end producing instruction, transmit an end consuming mode indication to the set of processing elements.

16. The data processing apparatus of claim 15, wherein the end of consuming mode indication comprises an end consuming mode tag appended to a final consumer instruction transmitted to the set of processing elements.

17. The data processing apparatus of claim 13, wherein when in the producing mode, the processing element is configured to pause generation of triggered instructions in response to a consumer queue full signal received from one of the set of processing elements.

18. The data processing apparatus of claim 13, wherein:
the processing element further comprises execution state storage circuitry to store the execution state; and
the front end circuitry is configured to determine, for each instruction of the plurality of instructions, whether the execution state of the processing element meets an associated trigger condition by comparing the execution state with an expected execution state corresponding to the that instruction.

19. A data processing method for operating a data processing apparatus comprising a plurality of processing elements connected via a network on a single chip arranged to form a triggered spatial architecture, each processing element comprising front end circuitry, decode circuitry, and execution circuitry, the method comprising:
processing, using the front end circuitry a plurality of instructions, and generating triggered instructions, each triggered instruction generated in response to an execution state of the processing element meeting a trigger condition associated with one of the plurality of instructions;
generating control signals, using the decode circuitry, in response to receiving the triggered instructions;
performing processing operations execution circuitry in response to the control signals and modifying the execution state of the processing element;
generating, using the decode circuitry, begin consuming control signals to control the processing element to operate in a consuming mode in response to a begin consuming instruction; and
retrieving, when operating in the consuming mode, consumer instructions transmitted from a corresponding processing element operating in a producing mode, and passing the consumer instructions to the decode circuitry as triggered instructions.

20. A data processing method for operating a data processing apparatus comprising a plurality of processing elements connected via a network on a single chip arranged to form a triggered spatial architecture, each processing element comprising front end circuitry, decode circuitry, and execution circuitry, the method comprising:
processing, using the front end circuitry a plurality of instructions, and generating triggered instructions, each triggered instruction generated in response to an execution state of the processing element meeting a trigger condition associated with one of the plurality of instructions;
generating control signals, using the decode circuitry, in response to receiving the triggered instructions; and
performing processing operations, using the execution circuitry, in response to the control signals and modifying the execution state of the processing element;
generating, using the decode circuitry, begin producing control signals to control the processing element to operate in a producing mode in response to a begin producing instruction; and
transmitting, when operating in the producing mode, the triggered instructions as consumer instructions to a set of processing elements of the plurality of processing elements, the consumer instructions to be executed by each of the set of processing elements when operating in a consuming mode.

* * * * *